J. ROBINSON.
MACHINE FOR THRESHING AND WINNOWING GRAIN, &c.
No. 10,455. Patented Jan. 24, 1854.
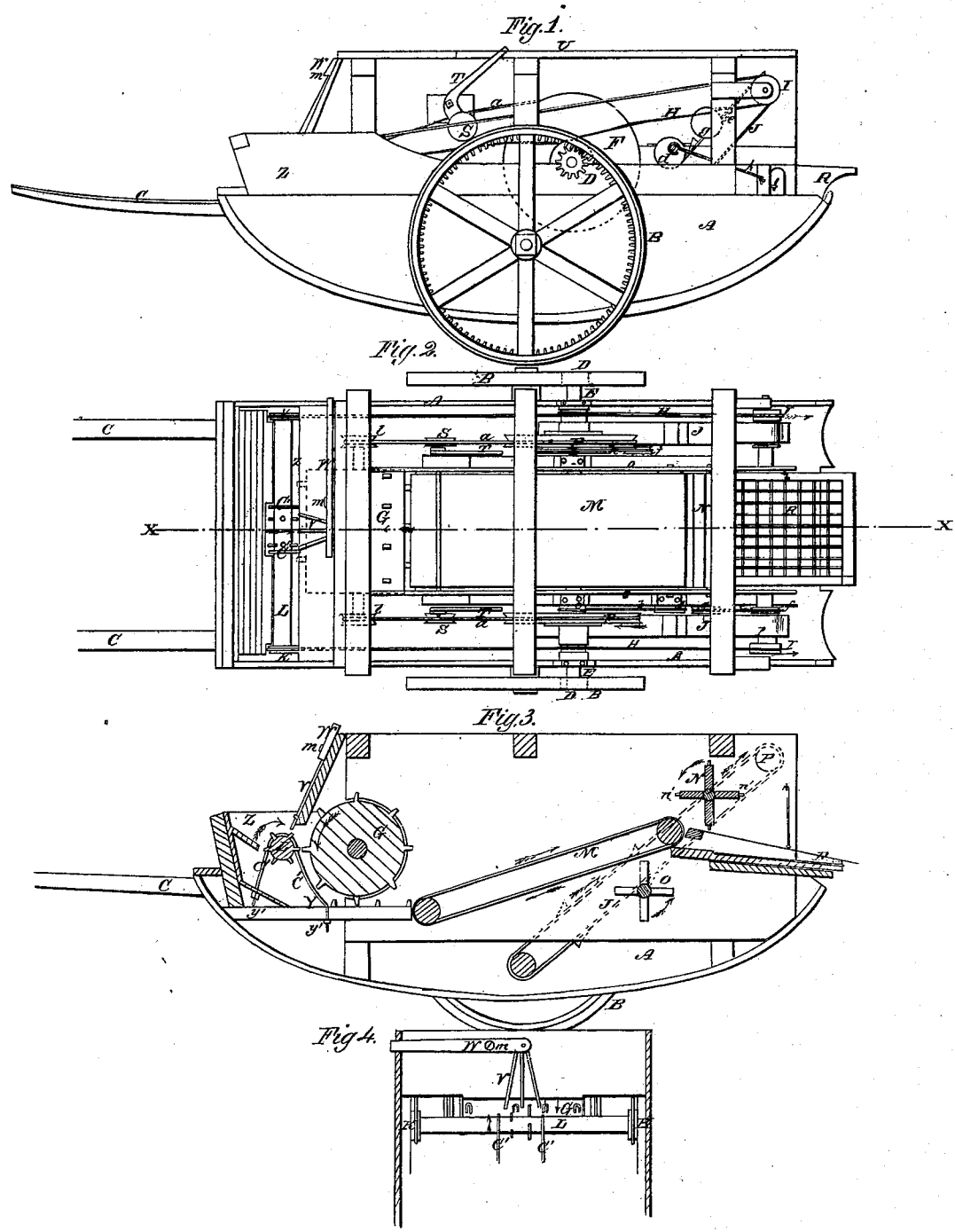

UNITED STATES PATENT OFFICE.

JAMES ROBINSON, OF WEST HEBRON, NEW YORK.

THRESHER AND CLEANER OF GRAIN.

Specification of Letters Patent No. 10,455, dated January 24, 1854.

*To all whom it may concern:*

Be it known that I, JAMES ROBINSON, of West Hebron, in the county of Washington and State of New York, have invented a new and useful Agricultural Implement for the purpose of threshing and winnowing grain and also bagging it in the field where it was cut; and I do hereby declare that the following is a full, clear, and exact description of the construction and operation of the same, reference being had to the annexed drawings, making a part of this specification, in which—

Figure 1, is a side elevation of the machine. Fig. 2, is a plan or bird's eye view of ditto. Fig. 3, is a vertical section of ditto taken through the center, X, X, Fig. 2, being the line of section. Fig. 4, is a front view of a portion of the machine, showing the small cylinder, or portion of the large cylinder, and the gages or adjusting rods for regulating the feed.

Similar letters of reference indicate corresponding parts in each of the several figures.

The nature of my invention consists, 1st, in placing a threshing machine, the necessary winnowing appurtenances and a grain elevator within a cart; the threshing machine and vehicle being so connected together and arranged that the motion of the wheels of the vehicle as it is moved, communicates motion to the various parts of the threshing machine, and certain arrangements for checking and steering the vehicle. By this arrangement grain may be threshed, winnowed, and bagged, in the field where it was cut, the threshing machine being in operation while the cart or vehicle is moving and the workmen gathering and placing the sheaves in the hopper.

My invention consists, 2nd, in the employment or use of adjusting rods in combination with a feed roller which will be hereafter described for the purpose of regulating the feed to be taken up by the feed roller.

Third. My invention also embraces an application of a gage of a peculiar form in combination with the feed roller and mouth of the concave to regulate the amount of feed to the threshing cylinder.

Fourth. Another improvement of my invention is the application of a revolving check and discharge wheel in combination with the endless belt, for the purpose of preventing the grain from being thrown over and out of the machine together with the chaff, and at the same time for discharging and carrying the grain and straw from the endless belt on to the screen.

Fifth. Another feature of my invention consists in the combination of a pair of tightening pulleys with the gearing and cart in such manner that the motion of the cart forward, and sideways in steering may be governed to a considerable extent by said pulleys.

To enable others skilled in the art to make and use my invention, I will proceed to describe fully its construction and operation.

A, represents a cart or vehicle having two wheels B, B, the bottom of the cart is of curved form as will be seen. C, C, are the shafts to which the horse is attached. The wheels B, B, are cogged on their inner peripheries, see Fig. 1, and give motion as they turn to the pinions D, D, there being a pinion meshing into each wheel, see dotted lines in Fig. 2, each pinion D, is hung on a small shaft E, on each one of which is placed or hung a pulley or pulleys F, see Figs. 1 and 2, these pulleys by means of the bands (*a*) (*a*) passing over the pulleys (*l*,) (*l*,) communicate motion to the threshing cylinder G, placed in the front part of the vehicle A. The small shafts E, have each a band H, passing around them, these bands also pass around pulleys I, I, by which the elevators J, J, are operated, the bands H, H, also pass around pulleys K, K, one at each end of the small feed roller L.

It will now be seen that as the wheels of the vehicle are turned, that the pinions D, D, are turned and that the threshing cylinder G, feed roller L and also the elevators are operated. M, is an inclined endless apron which is operated by a band (*b*) passing over the pulleys (*c*) (*d*), the pulley (*c*) being on the shaft E, and the pulley (*d*) on the upper roller of the apron.

The fan O is placed near and below the most elevated end of the endless belt, and is operated by the band (*h*) which passes over the pulleys (*i*) (*j*); the pulley *i* being on one of the shafts E, see Fig. 2, and the pulley (*j*) on the shaft of the fan O.

The check and discharge wheel N is placed above and just beyond the rear or most elevated end of the endless belt, and is a wheel somewhat in shape of a fan wheel, but its vanes are entire from the circumference to the axis. The vanes are made of leather usually but they may be made of wood. This wheel revolves with about one eighth of the velocity of the fan wheel O, and its object is to prevent the grain from being thrown over and out of the machine and at the same time to convey the grain and straw from the endless belt on to the screen. The shattered grain flying from the threshing cylinder is arrested by the vanes of the check wheel N, and by its revolution carried down upon the screen. From this circumstance therefore it will be seen that the vanes must be entire to perform their function of checking the grain and carrying it on to the screen, and in order that the straw should be carried over by it the arms to which the vanes are attached are furnished with projecting pins or points n' n' for seizing the straw. This check wheel is operated by the band e which passes over the pulleys f, g the pulley f being on the shaft P and the pulley g on the shaft of the wheel N.

The adjusting rods C' C' are rods of iron bent around the feed roller L and secured by their ends to the bottom of the concave. Those ends which are toward the threshing cylinder pass very near to the teeth of the same, and serve to keep the straw up to the cylinder. These rods are made adjustable by the usual device of the nut and screw as seen at y' y'. When these rods are raised from the surface of the feed roller, they diminish the amount of material taken up by the feed roller, and the raising and lowering of these rods is equivalent to the lengthening and shortening of the teeth of the feed roller. R, is a screen placed in the back part of the vehicle hung in the usual manner, motion being given it by a shake rod (k) see Fig. 1, attached to the pulley (d) on the upper roller of the endless apron. S, S, are friction rollers attached to the ends of bent levers or arms T, T, the ends of these arms work in slots in the cover or top U, of the machine, see Fig. 1. The object of the friction rollers is to create a greater or less bearing of the bands (l) (l) of the large threshing cylinder, and to operate in checking the motion of the carriage when necessary and also to govern to a considerable extent the steering of the same. When the carriage is under head-way, the great momentum of the threshing cylinder makes it difficult to arrest the carriage, but this is readily done by slacking the tightening pulleys on both sides. When it is desired to turn the carriage, one pulley is slackened and the other kept tight and the carriage is turned to the side toward the loose pulley. It would require great effort on the part of the horses to turn the carriage if both pulleys were tight, but by slackening one the horses immediately learn to obey the tendency of the carriage in the other direction.

V, are the gage rods which regulate the feed to the threshing cylinder. Three rods are represented, more may be employed if necessary, they are at their upper ends attached to a lever W, having its fulcrum at (m), now by raising or depressing the outer end of the lever W, the rods V, are also elevated or depressed, and as these rods are placed on an inclined board which forms the back side of a hopper if I may so term it, the aperture or space to the cylinders is made greater or less as desired, see Figs. 2, 3, and 4. Y, is a bed piece placed immediately under the cylinder G, and feed roller L, and has as well as the cylinder and feed roller teeth upon it.

Figs. 1 and 2, show clearly the manner in which motion is communicated to the several parts. Fig. 3, shows the position of the several parts and Fig. 4, shows the manner in which the gage or adjusting rods are employed, their application, et cetera.

Operation;—The vehicle A, being moved, the several parts are put in motion as above described and the grain being placed in the front part of the vehicle which I will designate by Z, Figs. 1, 2 and 3, it passes between the threshing cylinder G, and feed roller L, and between the cylinder G, and bed Y, the grain by this operation is threshed from the straw and is thrown, both grain and straw upon the inclined endless apron or belt M, the apron conveys the grain and straw to the screen R. The wheel N checks and carries around the loose grain and takes the straw from the apron, and the fan O blows off the chaff, dust etc. The straw passes over the screen R, and falls upon the ground, it being understood that the screen is operated by the shake rod (k); the grain passes through the screen and falls into the body of the vehicle which being of curved form, as before stated, settles at about the center of the body. The elevators J, J, carry the grain from the bottom of the vehicle upward and throw it out in sacks which may fit upon hooks at the back of the vehicle.

It may be as well to state that the endless belt M is placed between side pieces or a partition which extends downward nearly to the bottom of the vehicle as seen in Fig. 3, (o) representing one of the side pieces.

What I claim as my invention and desire to secure by Letters Patent is—

1. The mode of checking the motion of the carriage when under headway and steering the same by means of the tightening pulleys combined as described with the threshing cylinder and a two wheel cart with double gearing.

2. I also claim the employment, in the manner substantially described, of the adjusting rods (C' C') in combination with the feed roller for the purpose of regulating the amount of material to be taken up by the feed roller as herein explained.

3. I also claim the employment of said adjusting rods in combination with the feed roller and threshing cylinder for the purpose of regulating the amount of material to be taken up by the feed roller and of keeping up the material to the threshing cylinder.

4. I also claim the combination of the adjusting rods, feed roller and gage rods substantially in the manner herein above set forth.

5. I also claim the combination of the gage rods, with the feed roller, and concave or mouth of the concave, of the threshing machine substantially in the manner described.

JAMES ROBINSON.

Witnesses:
JOHN R. MCCLELLAN,
WM. GREENOUGH.